United States Patent
Wu

(10) Patent No.: US 7,515,889 B2
(45) Date of Patent: Apr. 7, 2009

(54) SCALING ADJUSTMENT USING PILOT SIGNAL

(75) Inventor: David Chaohua Wu, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 968 days.

(21) Appl. No.: 11/011,567

(22) Filed: Dec. 14, 2004

(65) Prior Publication Data

US 2005/0101284 A1 May 12, 2005

Related U.S. Application Data

(63) Continuation of application No. 10/083,201, filed on Feb. 26, 2002, now Pat. No. 6,832,078.

(51) Int. Cl.
*H04B 7/00* (2006.01)
*H04B 17/00* (2006.01)
*H04N 5/60* (2006.01)
*H04H 20/47* (2006.01)
*H04H 40/54* (2006.01)

(52) U.S. Cl. .................. 455/237.1; 455/226.1; 348/738; 381/2; 381/4

(58) Field of Classification Search .............. 381/2, 381/3, 6, 15–16, 97, 106, 4, 20–22; 455/237.1, 455/337, 226.1; 700/94; 348/481, 738; 332/138, 332/149, 125, 170; 329/347, 358
See application file for complete search history.

(56) References Cited

U.S. PATENT DOCUMENTS 6,118,879 A * 9/2000 Hanna .................. 381/106
6,192,086 B1 * 2/2001 Darr ..................... 375/295

FOREIGN PATENT DOCUMENTS

| EP | 0 251 703 | 1/1988 |
|---|---|---|
| JP | 05118415 | 5/1993 |
| JP | 06334618 | 2/1994 |

OTHER PUBLICATIONS

European Search Report, Oct. 7, 2004.
OET Bulletin No. 60, Revision A: "Multichannel Television Sound Transmission and Audio Processing Requirements for the BTSC System" Feb. 1986, Office of Engineering and Technology, XP002298198.

* cited by examiner

*Primary Examiner*—Vivian Chin
*Assistant Examiner*—George C Monikang
(74) *Attorney, Agent, or Firm*—McAndrews, Held & Malloy, Ltd.

(57) ABSTRACT

A demodulator (10) converts television signals to video baseband signals and audio baseband signals including stereo signals representing a right channel signal value, a left channel signal value and a pilot signal having an amplitude. A DSP (60) recursively finds a coefficient value for scaling that keeps the pilot signal amplitude within a range of values, there by improving baseband signal quality, such as stereo separation of stereo signals within the baseband signals.

20 Claims, 4 Drawing Sheets

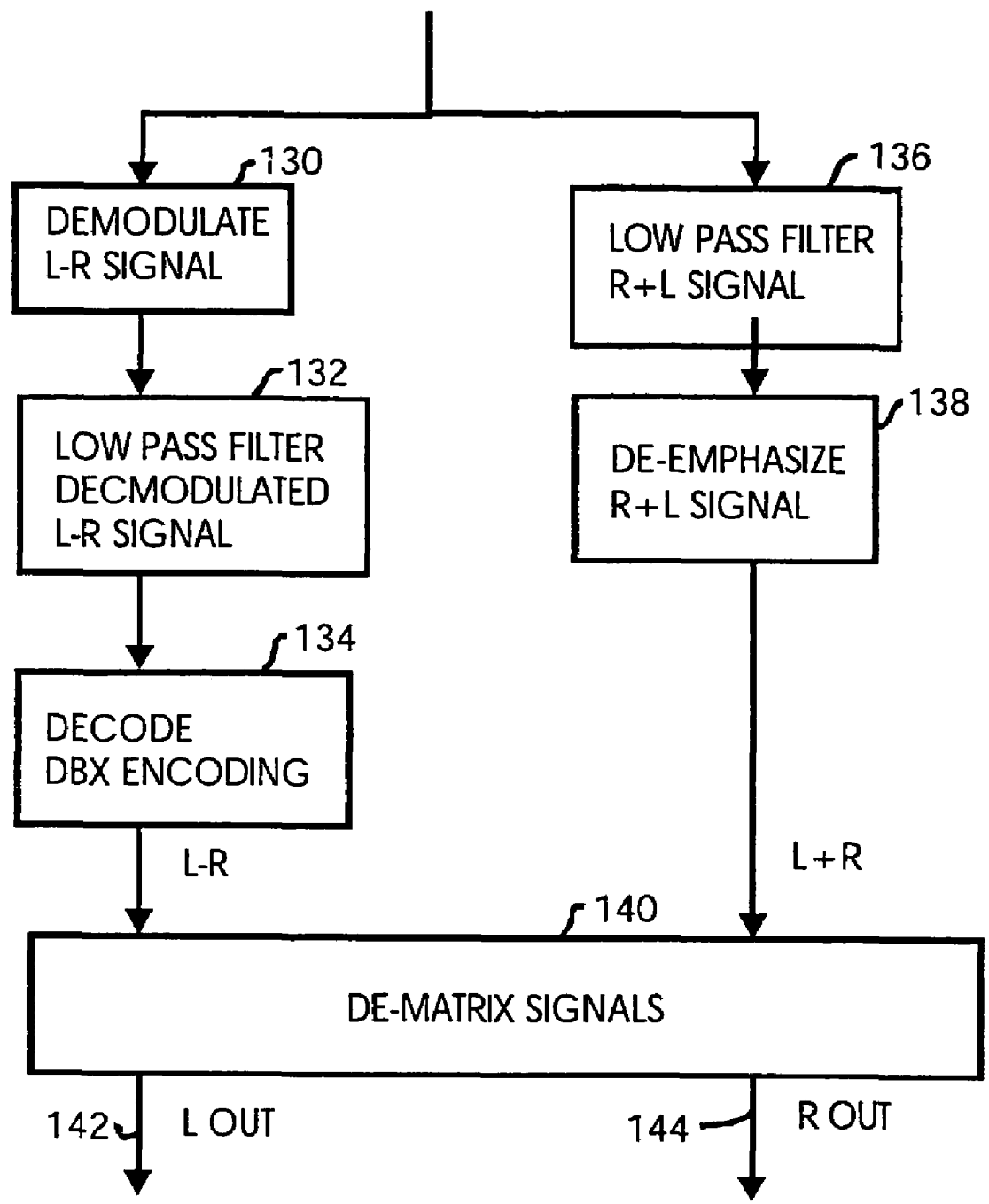

SCALING ADJUSTMENT USING PILOT SIGNAL

CROSS REFERENCE TO RELATED APPLICATION

The present application is a continuation of application U.S. Ser. No. 10/083,201, filed on Feb. 26, 2002, which is set to issue as U.S. Pat. No. 6,832,078 on Dec. 14, 2004.

BACKGROUND OF THE INVENTION

This invention relates to decoding audio signals and more particularly relates to adjustment of scaling to improve signal quality, such as enhancing stereo separation.

During the 1980s, the FCC adopted the BTSC format as a standard for multichannel television sound (MTS). Typically, the BTSC format is used with a composite TV signal that includes a video signal, as well as the BTSC format for sound reproduction.

The BTSC format is similar to FM stereo, but has the ability to carry two additional audio channels. Left plus right channel mono information is transmitted in a way similar to stereo FM in order to ensure compatibility with monaural television receivers. A 15.734 KHz pilot signal is used, instead of the FM stereo 19 KHz pilot signal, which allows the pilot signal to be phase-locked to the horizontal line frequency. A double sideband-suppressed carrier at twice the frequency of the pilot transmits the left minus right stereo information. The stereo information is dbx encoded to aid in noise reduction. An SAP channel is located at 5 times the pilot frequency. The SAP channel may be used for second language or independent source program material. A professional audio channel may be added at 6.5 times the plot frequency in order to accommodate additional voice or data.

Stereo tuners and demodulator units capable of decoding the BTSC format have been on the market for some time. The front end of the units typically includes analog components or integrated circuit chips that cause variation in the amplitude of the composite signal, including the BTSC portion of the signal. This variation in amplitude reduces signal quality. For example the variation reduces stereo separation of the right and left channel information carried in the composite signal. This invention addresses the problem and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One method embodiment of the invention is useful in a demodulator suitable for converting television signals to video baseband signals and audio baseband signals including a pilot signal having an amplitude. In such an environment, the quality of the demodulated audio baseband signals may be improved by a method comprising converting at least the audio baseband signals to corresponding digital audio baseband signals, including a digital pilot signal. At least a portion of the digital audio baseband signals, including the digital pilot signal, is scaled according to a coefficient having an adjustable coefficient value. The amplitude of the digital pilot signal is detected, and the coefficient value is adjusted in the event that the amplitude is outside a predetermined range of amplitudes.

One apparatus embodiment of the invention includes a computer readable medium encoded with a computer program which when executed by a computer improves the quality of audio baseband signals including a plot signal having an amplitude, the audio baseband signals having been converted to corresponding digital audio baseband signals, including a digital pilot signal. The computer program causes the computer to perform a method comprising:

scaling at least a portion of the digital audio baseband signals, including the digital pilot signal, according to a coefficient having an adjustable coefficient value;

detecting the amplitude of the digital pilot signal; and adjusting the coefficient value in the event that the amplitude is outside a predetermined range of amplitudes.

By using the foregoing techniques, the quality of audio signals may be improved. For example, stereo separation of stereo signals within the audio signals may be improved.

These and other advantages and novel features of the present invention, as well as details of an illustrated embodiment thereof, will be more fully understood from the following description and drawings.

BRIEF DESCRIPTION OF THE DRAWINGS

FIG. 4 is a flow diagram illustrating demodulation of the stereo signals shown in FIG. 2.

DETAILED DESCRIPTION OF THE INVENTION

Figure 1:
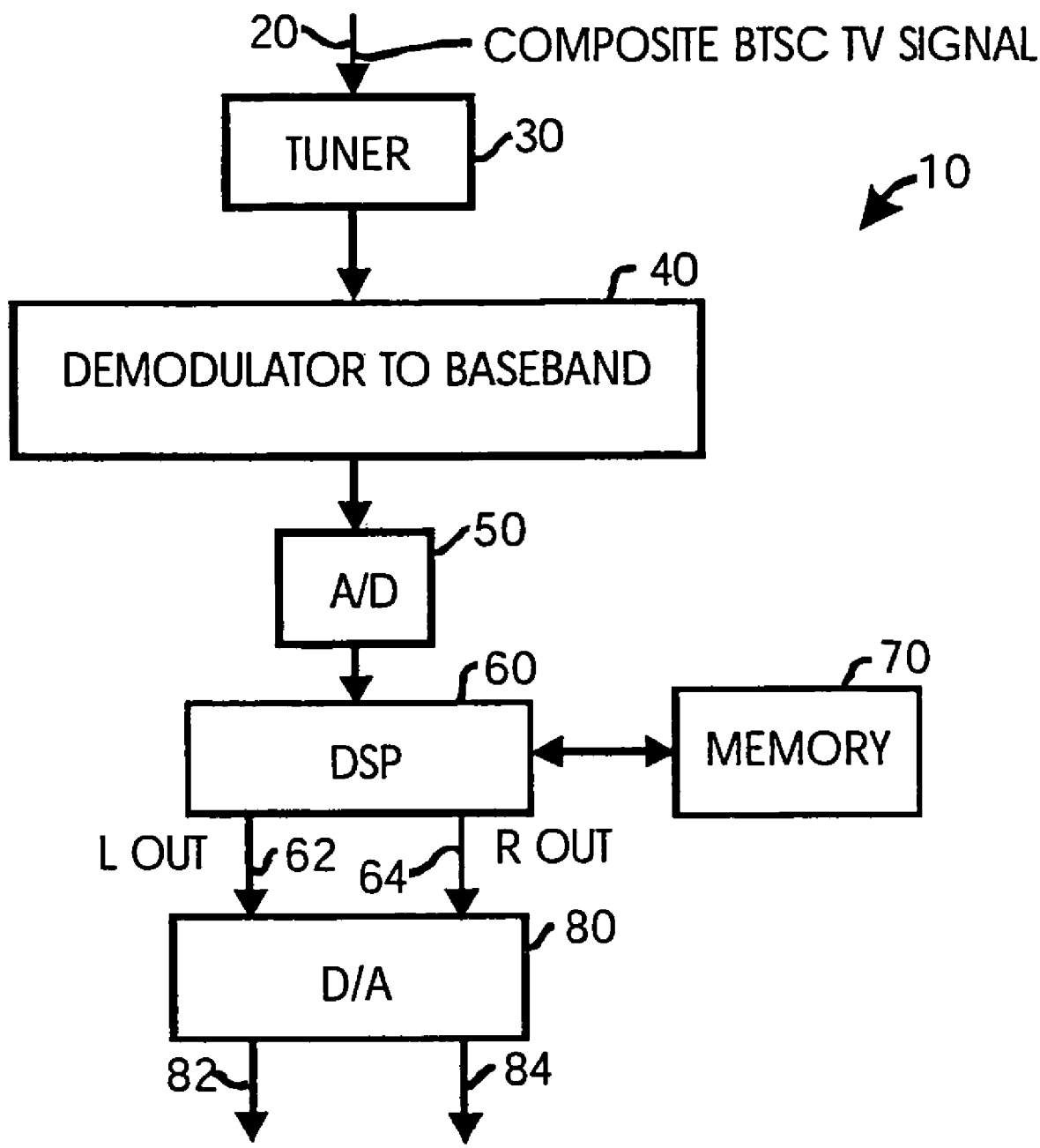
FIG. 1 is a schematic diagram of one form of a demodulator made in accordance with the invention, including a digital signal processor (DSP).

Referring to FIG. 1, a demodulator 10 made in accordance with one form of the invention includes an input path 20 that receives an analog composite TV signal that comprises a video signal, as well as a BTSC format stereo signal that has been frequency modulated on a carrier signal. The BTSC format stereo signal includes signals representing a right channel signal value and a left channel signal value, as well as a pilot signal having an amplitude.

A tuner 30 tunes the demodulator to the carrier signal. A demodulator 40 demodulates the analog composite TV signal to analog baseband signals, including the BTSC format stereo signal.

An analog to digital converter (A/D) 50 converts the analog BTSC format signals to corresponding digital signals. A/D 50 samples at a rate of 316.406 KHz.

A digital signal processor (DSP) 60 receives the digital signals and operates on them by executing algorithms stored in a memory 70.

The DSP generates a signal corresponding to the left stereo channel on an output port 62 and generates a signal corresponding to the right stereo channel on an output port 64. The digital signal on ports 62 and 64 are processed by a digital to analog (D/A) converter 80 in order to generate an analog left channel signal on a path 82 and to generate an analog right channel signal on a path 84.

Figure 2:
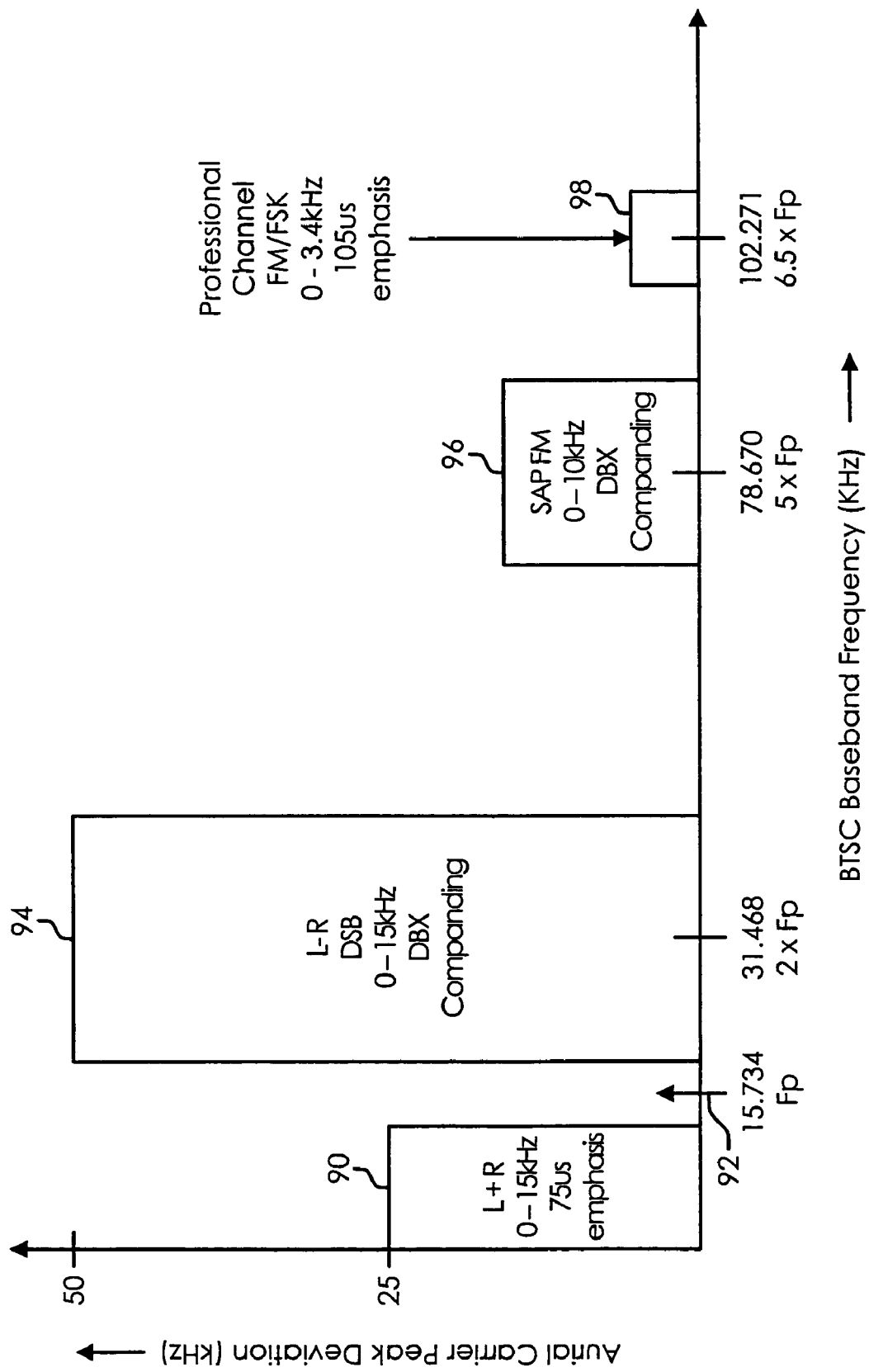
FIG. 2 is a diagram illustrating the BTSC signal frequency format.

The baseband BTSC component of the composite TV signal generated by demodulator 40 is illustrated in FIG. 2. A frequency band 90 from 0-15 KHz carries the sum of the left and right stereo channel signals (the L+R signal). A pilot signal 92 is carried at 15.734 KHz. A frequency band 94 centered at twice the pilot signal frequency carries the difference between the left and right stereo channel signals (the L−R signal). A frequency band 96 centered at five times the pilot signal frequency carries an SAP signal. A frequency band 98 centered at 6.5 times the frequency of the pilot signal carries a professional channel.

Figure 3:
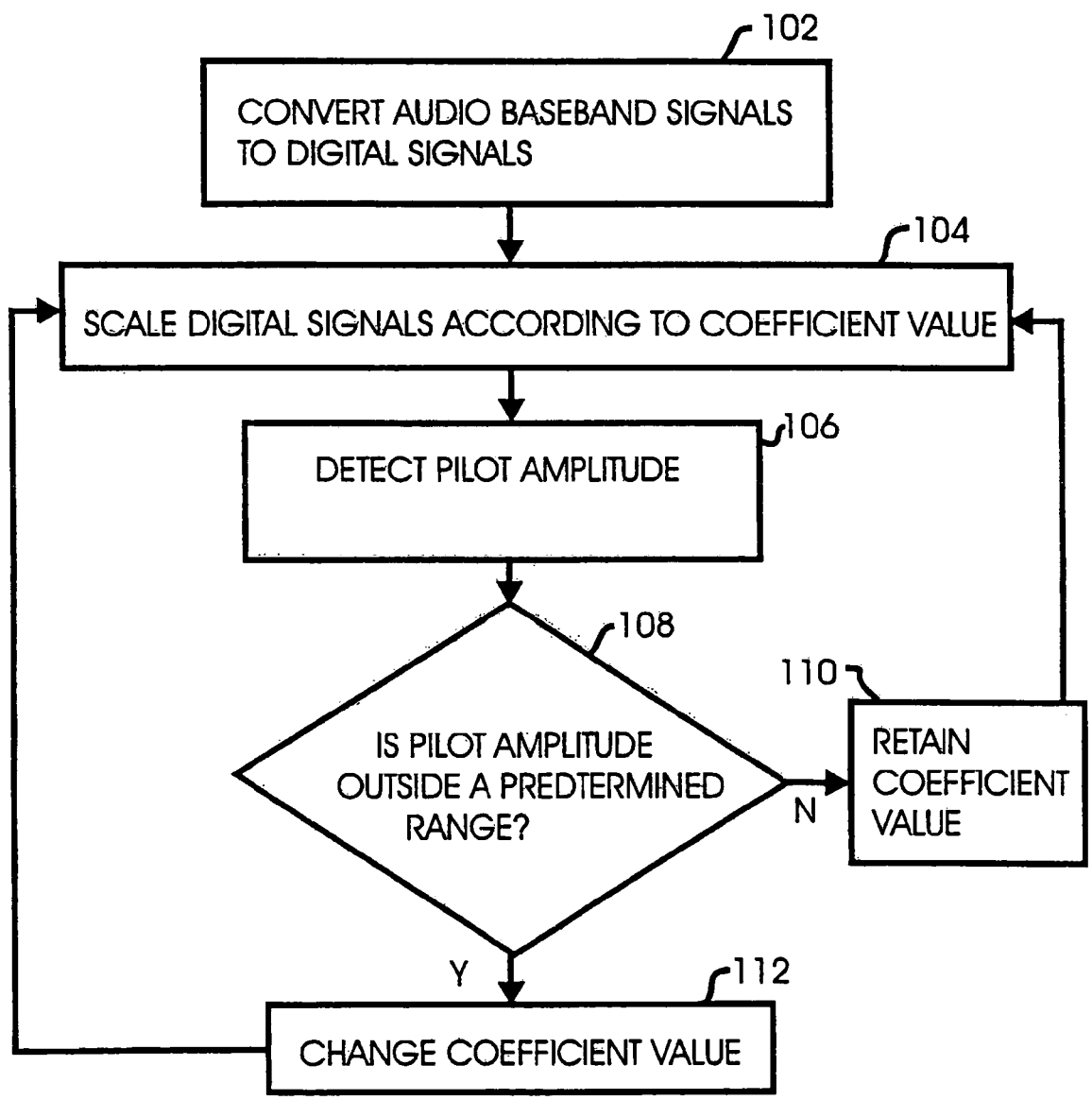
FIG. 3 is a flow diagram illustrating steps performed by the DSP shown in FIG. 1.

FIG. 3 is a flow chart illustrating one step performed by A/D 50 and various operations performed by DSP 60 by executing one of the algorithms stored in memory 70. In general, the pilot tone amplitude relative to the BTSC composite signal amplitude, specified by OET Bulletin No. 60, is 5 KHz of frequency deviation versus 73 KHz frequency deviation of the composite signal. Since the composite signal is frequency modulated, the 5 KHz value corresponds to the desired amplitude of the pilot signal. Pilot signal amplitude is detected and used as a scaling reference to correct composite signal amplitude. According to OET Bulletin No. 60, the maximum pilot signal amplitude error is +/− 0.5 KHz, which is +/− 10%. This error still keeps the stereo separation above 20 dB. Since the pilot signal amplitude and frequency is well controlled in encoder design, and the amplitude error typically is around 3-5%, the resulting stereo separation typically is somewhere between 25 to 30 dB if demodulation amplitude error is 3-5% or less.

Still referring to FIG. 3, in a step 102, A/D 50 converts analog BTSC format audio signals to corresponding digital audio signals, including a digital pilot signal having an amplitude. In a step 104, DSP 60 scales the digital signals corresponding to the amplitude of the L+R signal and the amplitude of the L−R signal, as well as the digital pilot signal, according to a coefficient value. The scaling may be carried out by a multiplication function. The coefficient value determines the factor by which the amplitudes of the L+R and L−R signals, as well as the digital pilot signal, are multiplied. The coefficient value is stored in memory 70.

In a step 106, in response to the digital signals scaled in step 104, DSP 60 detects the digital pilot signal amplitude. The amplitude is detected by full wave rectifying the digital pilot signal and time constant averaging the rectified pilot signal. The choice of time constant is based on frequency of the digital pilot signal.

In a step 108, if the pilot amplitude is outside a predetermined range of amplitude values, the coefficient value is changed in a step 112, and the program loops back to step 104. Step 108 is performed by normalizing the detected amplitude and comparing the normalized amplitude with a programmable range of reference values. The range may be zero, in which case, the normalized amplitude is compared with a reference value alone without a range. For example, the reference value may be 5 KHz and the range may be 5 KHz plus or minus 1 percent.

The coefficient value is increased or decreased depending on the relationship between the range of reference values and the normalized amplitude. For example, if the normalized amplitude is above the range of reference values, the coefficient value is decreased to decrease the digital pilot signal amplitude. If the normalized amplitude is below the range of reference values, the coefficient value is increased to increase the digital pilot signal amplitude. The increased coefficient value may be achieved by incrementing the coefficient value and the decreased coefficient value may be achieved by decrementing the coefficient value.

If the normalized amplitude is within the programmable range of reference values, then the current coefficient value is retained as described in a step 110, and the program loops back to step 104.

Additional details about the algorithms stored in memory 70 are described in the following applications filed on the same day as this application and incorporated by reference in their entirety: "System and Method of Performing Digital Multi-Channel Audio Signal Decoding," filed under Ser. No. 10/083,052; System and Method for SAP FM Demodulation," filed under Ser. No. 10/083,076; "Method and Apparatus of Performing Sample Rate Conversion of a Multi-Channel Audio Signal," filed under Ser. No. 10/082,950 and "Scaling Adjustment To Enhance Stereo Separation," filed in the name of David Wu under Ser. No. 10/083,203.

Memory 70 comprises a computer readable medium encoded with a computer program which when executed by DSP 60 causes DSP 60 to perform the steps shown in FIGS. 3 and 4. The computer program may be stored on other readable medium, such as magnetic media, including floppy disks, and optical media, including CD-ROMs and DVD disks.

FIG. 4 describes the steps carried out by DSP 60 to demodulate the L−R and L+R stereo signals within the audio baseband signals. In a step 130, DSP 60 demodulates the L−R signal; in a step 132, DSP 60 low pass filters the demodulated L−R signal; and in a step 134, DSP 60 decodes the dbx encoding of the L−R signal.

Still referring to FIG. 4, in a step 136, DSP 60 low pass filters the L+R signal, and in a step 138 DSP 60 de-emphasizes the L+R signal. (Emphasis is used to reduce noise in the composite TV signal. De-emphasis is performed to restore the original wave shape of the signal before emphasis.)

In a step 140, DSP 60 performs a de-matrix operation on the L−R signal and the L+R signal in order to generate a left channel digital signal 142 and a right channel digital signal 144. Any mismatch in the amplitude of the right and left channel digital signals causes loss of stereo separation. However, due to the adjustment of the coefficient values performed in steps 108 and 112, any loss of separation is reduced.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A demodulator suitable for converting a multi-channel signal to video baseband signals and audio baseband signals including a pilot signal having an amplitude, said demodulator comprising:

an analog-to-digital converter that converts at least the audio baseband signals to corresponding digital audio baseband signals, including a digital pilot signal; and a digital signal processor that scales at least a portion of the digital audio baseband signals, including the digital pilot signal, according to a coefficient having an adjustable coefficient value, that detects the amplitude of the digital pilot signal, and that adjusts the coefficient value if the amplitude of the digital pilot signal is outside a predetermined range of amplitudes.

2. The demodulator of claim 1, wherein the audio baseband signals comprise audio baseband signals according to the BTSC standard.

3. The demodulator of claim 1, wherein the digital signal processor scales the at least a portion of the digital audio baseband signal by multiplying.

4. The demodulator of claim 1, wherein the predetermined range of amplitudes includes 5 KHz.

5. The demodulator of claim 1, wherein the predetermined range of amplitudes comprises a range of amplitudes within 3 percent of 5 KHz.

6. The demodulator of claim 1, wherein the analog-to-digital converter converts at a sampling rate exceeding 300 kilosamples per second.

7. The demodulator of claim 1, wherein the digital signal processor detects the amplitude of the digital pilot signal by full wave rectifying the digital pilot signal and time constant averaging of the rectified digital pilot signal.

8. The demodulator of claim 7, wherein the time constant averaging is based on the frequency of the digital pilot signal.

9. The demodulator of claim 1, wherein the digital signal processor adjusts the coefficient value by normalizing the amplitude and comparing the normalized amplitude with a programmable reference range of amplitude values.

10. The demodulator of claim 9, wherein the digital signal processor increases the coefficient value if the normalized amplitude value of the digital pilot signal has a first relationship with respect to the reference range of amplitude values and decreases the coefficient value if the normalized amplitude value of the digital pilot signal has a second relationship with respect to the reference range of amplitude values.

11. The demodulator of claim 9, wherein the first relationship comprises one of an amplitude value greater than the reference range of amplitude values and an amplitude value less than the reference range of amplitude values and wherein the second relationship is opposite the first relationship.

12. The demodulator of claim 11, wherein the increasing comprises incrementing and wherein the decreasing comprises decrementing.

13. The demodulator of claim 1, wherein the multi-channel signal comprises a television signal.

14. The demodulator of claim 1,
wherein the digital signal processor generates a first signal corresponding to a left stereo channel on a first output port of the digital signal processor, and
wherein the digital signal processor generates a second signal corresponding to a right stereo channel on a second output port of the digital signal processor.

15. The demodulator of claim 14, comprising:
a digital-to-analog converter operatively coupled to the digital signal processor,
wherein the digital-to-analog converter processes the first signal and the second signal to generate an analog left channel signal and an analog right channel signal.

16. The demodulator of claim 1, wherein the analog-to-digital converter receives a baseband BTSC component of a composite television signal.

17. The demodulator of claim 1,
wherein the baseband BTSC component comprises the pilot signal and two stereo channel signal frequency bands, and
wherein, in a frequency domain, the pilot signal is approximately disposed between the two stereo channel signal frequency bands.

18. The demodulator of claim 17, wherein the two stereo channel signal frequency bands carry a sum of a left stereo channel signal and a right stereo channel signal and a difference of the left stereo channel signal and the right stereo channel signal.

19. The demodulator of claim 17, wherein one of the two stereo channel signal frequency bands is centered on a frequency that is twice a frequency of the pilot signal.

20. The demodulator of claim 1, comprising:
a tuner that tunes the demodulator to a carrier signal.

* * * * *